US010482772B2

(12) United States Patent
Kumari et al.

(10) Patent No.: US 10,482,772 B2
(45) Date of Patent: Nov. 19, 2019

(54) SYSTEM AND METHOD FOR GENERATING AN OPTIMIZED SEARCH AND RESCUE PROFILE FOR AN IN-FLIGHT AIRCRAFT

(71) Applicant: HONEYWELL INTERNATIONAL INC., Morris Plains, NJ (US)

(72) Inventors: Sanju Kumari, Karnataka (IN); Minni Ambooken, Karnataka (IN); Subhadeep Pal, Karnataka (IN); Nithin Ambika, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 43 days.

(21) Appl. No.: 15/786,725

(22) Filed: Oct. 18, 2017

(65) Prior Publication Data

US 2019/0114926 A1    Apr. 18, 2019

(51) Int. Cl.
*G08G 5/00* (2006.01)
*G01C 23/00* (2006.01)
*B64D 43/00* (2006.01)

(52) U.S. Cl.
CPC ......... *G08G 5/0013* (2013.01); *G01C 23/005* (2013.01); *G08G 5/0021* (2013.01); *G08G 5/0026* (2013.01); *G08G 5/0039* (2013.01); *G08G 5/0043* (2013.01); *G08G 5/0086* (2013.01); *G08G 5/0091* (2013.01); *B64D 43/00* (2013.01)

(58) Field of Classification Search
CPC .. G08G 5/0013; G08G 5/0021; G08G 5/0026; G08G 5/0086; G08G 5/0043; G08G 5/0039; G08G 5/0091; G01C 23/005; B64D 43/00
See application file for complete search history.

(56) References Cited

U.S. PATENT DOCUMENTS 7,437,225 B1   10/2008 Rathinam
8,698,668 B2 *  4/2014 Hellsten .............. G01S 13/9029
                                                 342/25 A (Continued)

FOREIGN PATENT DOCUMENTS

WO   WO2004044694    *  5/2004
WO   WO2015177187    *  11/2015
WO   WO20160964415   *  6/2016

OTHER PUBLICATIONS

Arbeit, A., Adaptation and Automation of Search and Rescue Patterns with Implementation for an Operational Unmanned Aircraft System; A thesis submitted in partial fulfillment of the requirements for the degree of Master of Science in Aeronautics & Astronautics, University of Washington, 2013.*

(Continued)

*Primary Examiner* — Russell Frejd
(74) *Attorney, Agent, or Firm* — Lorenz & Kopf, LLP

(57) ABSTRACT

Methods and systems are provided for generating a flight profile for search and rescue (SAR) operations. The method comprises monitoring flight parameters of an in-flight aircraft engaged in star operations through the aircraft's flight management system (FMS). The flight parameters are transmitted to a ground-based FMS that accesses a terrain database and a real-time weather database. With this information, the ground-based FMS generates a star flight profile for the aircraft. The flight profile is then transmitted to the in-flight aircraft's FMS.

18 Claims, 2 Drawing Sheets

(56) References Cited

U.S. PATENT DOCUMENTS

| | | | |
|---|---|---|---|
| 8,744,760 B1* | 6/2014 | Mishmash | G01C 23/005 |
| | | | 701/454 |
| 9,613,536 B1 | 4/2017 | Wolford et al. | |
| 9,666,083 B2* | 5/2017 | Girardeau | G08G 5/0039 |
| 9,697,737 B2 | 7/2017 | Hale et al. | |
| 2009/0037091 A1 | 2/2009 | Bolt, Jr. et al. | |
| 2015/0112549 A1* | 4/2015 | Mathew | G06K 9/0063 |
| | | | 701/36 |
| 2016/0078769 A1* | 3/2016 | Coulmeau | G01C 21/20 |
| | | | 701/537 |
| 2016/0275801 A1* | 9/2016 | Kopardekar | G08G 5/0043 |
| 2016/0328978 A1 | 11/2016 | Ramaker et al. | |
| 2017/0178517 A1 | 6/2017 | Arneau et al. | |
| 2017/0206790 A1 | 7/2017 | Reddy et al. | |
| 2018/0033313 A1* | 2/2018 | Mellema | B64C 39/024 |
| 2018/0336788 A1* | 11/2018 | Singla | G08G 5/0047 |

OTHER PUBLICATIONS

Machine Translation: WO 2015/177187, published Nov. 2015.*
European Patent and Trademark Office, European Extended Search Report for Application No. EP18201078.5 dated Mar. 21, 2019.
Chua,"Integration of Multiple Unmanned Systems in an Urban Search and Rescue Environment" Calhoun: The NPS Institutional Archive DSpace Repository, Mar. 31, 2013, XP055567017, Retrieved From the Internet, URL:Https://Calhoun.Nps.Edu/Bitstream/Hand Le/10945/32805/13marChuaBoonheng.Pdf [Retrieved on Mar. 11, 2019].
Bertuccelli et al.,"Real-Time Multi-UAV Task Assignment in Dynamic and Uncertain Environments" DOI: 10.2514/6.2009-5776, ISBN: 978-1-60086-978-5, Aiaa Guidance, Navigation, and Control Conference, August 10, 2009, XP055567019, Reston, Virginia.

* cited by examiner

SYSTEM AND METHOD FOR GENERATING AN OPTIMIZED SEARCH AND RESCUE PROFILE FOR AN IN-FLIGHT AIRCRAFT

TECHNICAL FIELD

The present invention generally relates to aircraft flight operations, and more particularly relates to a system and method for generating an optimized search and rescue profile for an in-flight aircraft.

BACKGROUND

Search and rescue (SAR) operations are typically mounted by emergency services aircraft and helicopters to locate, retrieve and rescue personnel over inaccessible areas. These operations typically use search patterns in an attempt to minimize time until locating missing personnel. However, many low-cost aircraft and helicopters used to support these operations often lack the equipment necessary to coordinate these efforts. For example, low cost helicopters such as emergency medical service (EMS) helicopters are equipped with a light versions of a flight management system (FMS) that does not support SAR patterns computation and/or do not have connectivity with other complex systems such as terrain databases and weather information. Moreover, the limited storage space in onboard computer of an aircraft/helicopter typically cannot store complex FMS data or other supporting systems such as terrain and navigation databases. Additionally, these Helicopters need to perform search and rescue operations in very remote locations where access to air traffic control (ATC) support may not be available. Hence, there is a need for a system and method for generating and transmitting an optimized search and rescue profile for an in-flight aircraft over a wide area of coverage.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for generating a flight profile for search and rescue (SAR) operations. The method comprises: monitoring flight parameters with an onboard flight management system (FMS) for an in-flight aircraft engaged in SAR operations; transmitting the flight parameters of the in-flight aircraft from the onboard FMS to a ground-based FMS; accessing a terrain database and a real-time weather database with the ground-based FMS; generating an SAR flight profile for the in-flight aircraft with the ground-based FMS, where the SAR flight profile is based on the flight parameters of the in-flight aircraft, the terrain, and the real-time weather; and transmitting the SAR flight profile from the ground-based FMS to the onboard FMS of the in-flight aircraft.

A system is provided for generating a flight profile for search and rescue (SAR) operations. The system comprises: an in-flight aircraft engaged in SAR operations with an onboard flight management system (FMS) that monitors the flight parameters of the in-flight aircraft; a satellite communications (SATCOM) transceiver located on board the in-flight aircraft that transmits the flight parameters to a ground-based FMS; a terrain database that provides real-time terrain data to the ground-based FMS; a real-time weather database that provides real-time weather data to the ground-based FMS; and a ground-based FMS that generates a SAR flight profile for the in-flight aircraft based on the flight parameters, the terrain data and the real-time weather data and transmits the SAR flight profile to the SATCOM transceiver on board the in-flight aircraft.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for generating an optimized flight profile for in-flight aircraft during search and rescue (SAR) operations has been developed. In some embodiments, the method monitors the flight parameters for an in-flight aircraft through its' onboard flight management system (FMS), aircraft tracking system (ATS) or flight data monitoring system (FDMS). The flight parameters are transmitted to a ground-based FMS that accesses a terrain database and a real-time weather database. The ground-based FMS generates a SAR profile for the in-flight aircraft based on the flight parameters, the terrain data and the real-time weather data. The ground based FMS uses the information gathered from the airborne system to extrapolate the aircraft trajectory in conjunction with the on-ground terrain and weather systems to compute the optimized search and rescue pattern around the aircraft. The SAR flight profile is then transmitted back to the onboard FMS or navigation system of the in-flight aircraft.

Figure 1:
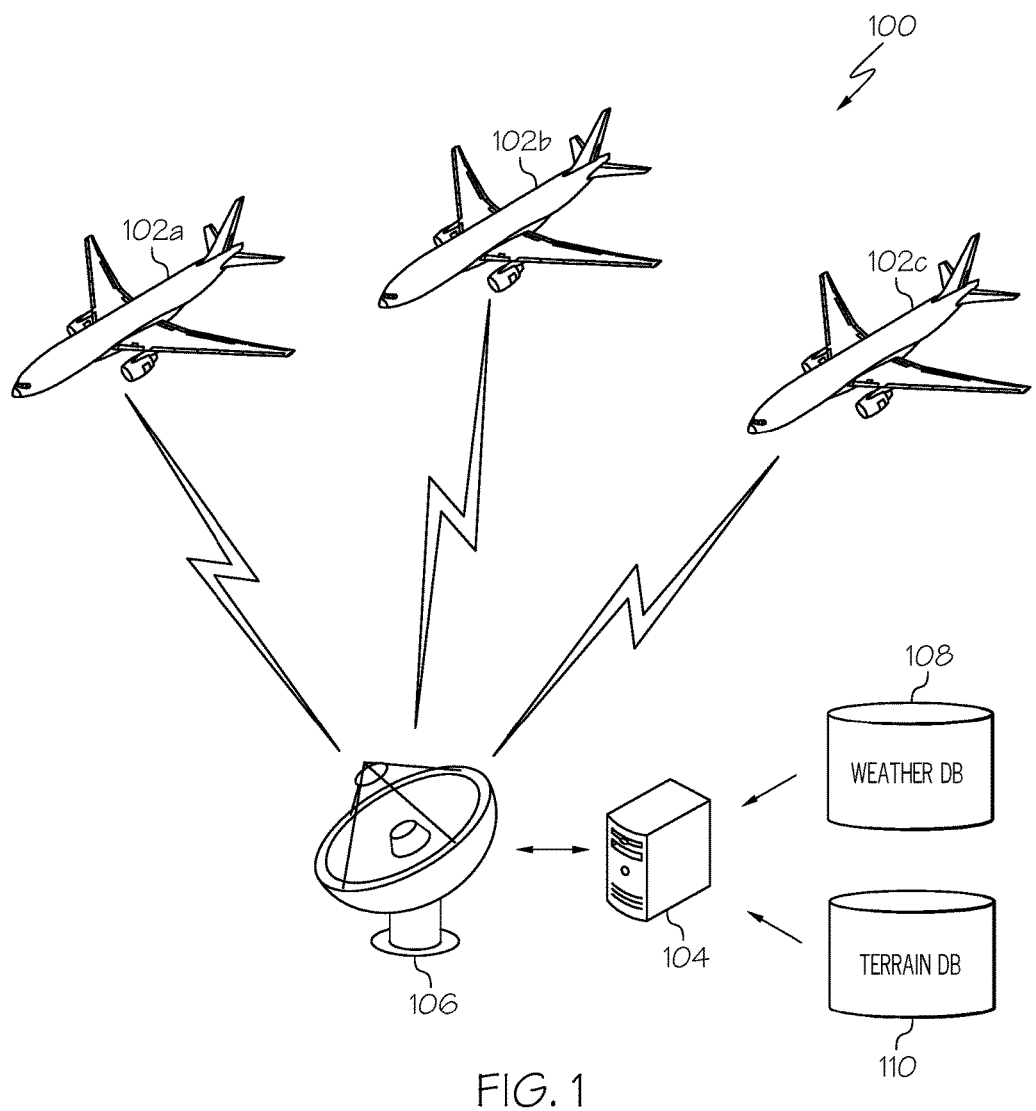
FIG. 1 shows a block diagram of a system for generating an optimized search and rescue flight profile in accordance with one embodiment.

Turning now to FIG. 1, a block diagram 100 is shown of a system for generating an optimized search and rescue profile in accordance with one embodiment. In this example, in-flight aircraft 102a, 102b and 102c gather flight parameters from an onboard FMS, ATS or FDMS. The parameters are downloaded to a ground-based FMS 104 through a satellite communications (SATCOM) 106 link. The ground-based FMS 104 then accesses a real-time weather database 108 to download real-time weather data for the SAR operations area. Additionally, the ground-based FMS 104 downloads terrain data from a terrain database 110 that covers the SAR operations area. The ground-based FMS 104 generates an optimized SAR flight profile for the in-flight aircraft 102a, 102b and 102c that is transmitted through the SATCOM link 106. Upon receipt from the ground-based FMS, the SAR flight profile is loaded into the onboard FMS or navigation system of the in-flight aircraft. In alternative embodiments, the SAR flight profile may also be loaded into an electronic flight bag (EFB) on board the in-flight aircraft or an electronic tablet, or any other suitable electronic storage and display system that is accessible by the aircrew.

During operations, the flight pulled parameters collected by the onboard FMS, ATS or FDMS of the in-flight aircraft may include: latitude; longitude; altitude; flight angle; track; and airspeed. These flight parameters may be transmitted to the ground-based FMS on a predetermined periodic basis. In alternative embodiments, the flight parameters may be transmitted upon demand by the ground-based FMS or transmitted upon command by the aircrew of the aircraft in order to request a SAR flight profile.

In alternative embodiments, the system 100 may generate SAR flight profiles for multiple aircraft as shown in FIG. 1. The multiple SAR profiles will be coordinated with each other in order to optimize SAR operations across a designated search area. While FIG. 1 shows a conventional aircraft in use with the system 100, in alternative embodiments the aircraft could be a helicopter, unmanned aerial vehicle (UAV), remotely piloted vehicle (RPV), etc. In other embodiments, the communications link between the onboard FMS of the in-flight aircraft and the ground-based FMS could be a high-frequency (HF) radio or a very high frequency (VHF) radio or other suitable communication system between the aircraft and the ground.

Figure 2:
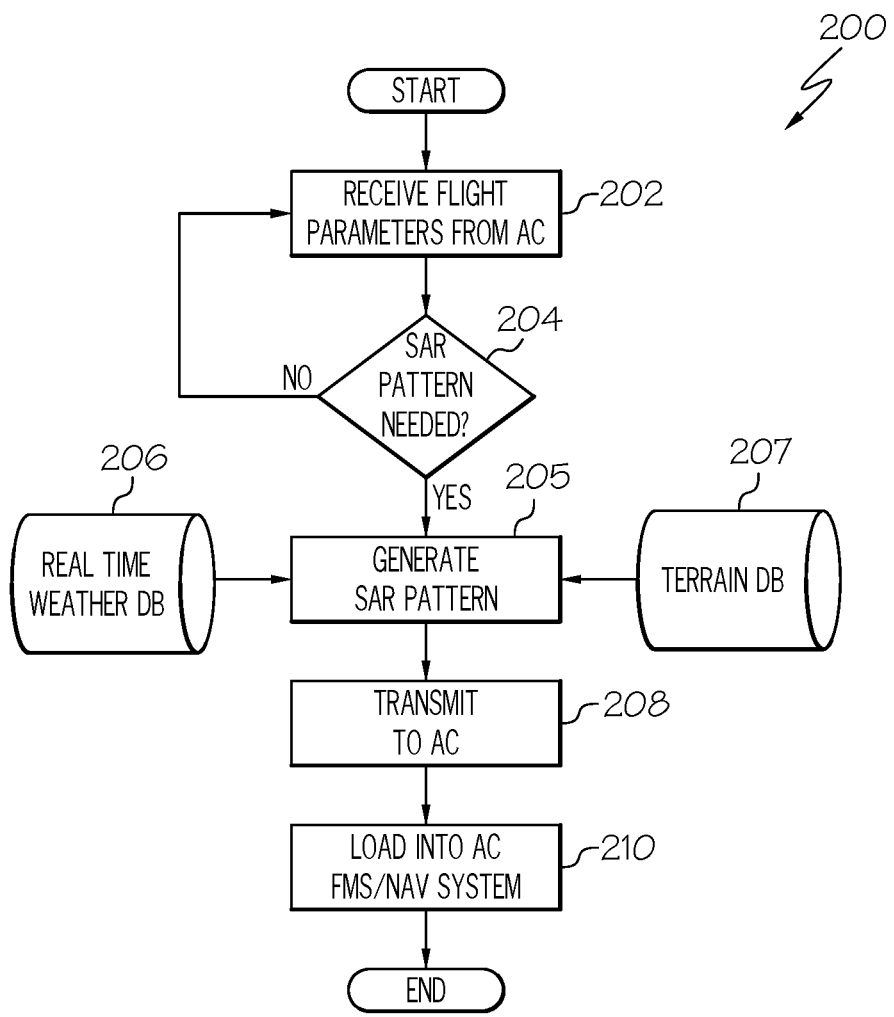
FIG. 2 shows a flowchart of a method for generating an optimized search and rescue flight profile in accordance with one embodiment.

Turning now to FIG. 2, a flowchart 200 is shown of a method for generating an optimized flight profile for SAR operations in accordance with one embodiment. In this embodiment, a ground-based FMS receives flight parameters from an onboard FMS, ATS or FDMS of an in-flight aircraft 202. The ground-based FMS determines if an optimize SAR pattern is needed for the aircraft 204. If a pattern is needed, the ground-based FMS generates a SAR pattern 205 based on the flight parameters, real-time weather data accessed from a real-time weather database 206, and terrain data accessed from a terrain database 207. The SAR pattern is transmitted to the aircraft 208 and loaded onto the aircraft's onboard FMS or navigation system 210. If the ground-based FMS determines that a SAR pattern is not needed 204, the ground-based FMS will monitor the flight parameters that are received from the aircraft on a continuous basis.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for generating a flight profile for search and rescue (SAR) operations, comprising:
    monitoring flight parameters with an onboard flight management system (FMS) for an in-flight aircraft engaged in SAR operations;
    transmitting the flight parameters of the in-flight aircraft from the onboard FMS to a ground-based FMS, where the flight parameters are transmitted upon command by an aircrew member of the in-flight aircraft in order to request generation of a SAR flight profile for the onboard FMS which lacks a capability to generate a SAR flight profile;
    accessing a terrain database and a real-time weather database with the ground-based FMS;
    generating an SAR flight profile for the in-flight aircraft with the ground-based FMS, where the SAR flight profile is based on the flight parameters of the in-flight aircraft, the terrain, and the real-time weather;
    transmitting the SAR flight profile from the ground-based FMS to the onboard FMS for the in-flight aircraft; and
    loading the SAR flight profile generated by the ground-based FMS into the onboard FMS of the in-flight aircraft.

2. The method of claim 1, further comprising:
    loading the SAR flight profile into the onboard navigation system of the in-flight aircraft.

3. The method of claim 1, further comprising:
    loading the SAR flight profile into an electronic flight bag (EFB) on board the in-flight aircraft.

4. The method of claim 1, further comprising:
    loading the SAR flight profile into an electronic tablet on board the in-flight aircraft.

5. The method of claim 1, where the flight parameters are monitored with an Aircraft Tracking System (ATS).

6. The method of claim 1, where the flight parameters are monitored with a Flight Data Monitoring System (FDMS).

7. The method of claim 1, where transmission between the onboard FMS and the ground-based FMS is by satellite communication (SATCOM).

8. The method of claim 1, where transmission between the onboard FMS and the ground-based FMS is by high-frequency (HF) radio.

9. The method of claim 1, where transmission between the onboard FMS and the ground-based FMS is by very high frequency (VHF) radio.

10. The method of claim 1, where the flight parameters comprise latitude, longitude, altitude, flight angle, track and airspeed.

11. The method of claim 1, where the flight parameters of the in-flight aircraft are transmitted to the ground-based FMS on a predetermined periodic basis.

12. The method of claim 1, where the flight parameters of the in-flight aircraft are transmitted on demand by the ground-based FMS.

13. The method of claim 1, where the ground-based FMS generates multiple SAR flight profiles for additional aircraft engaged in SAR operations.

14. The method of claim 13, where the multiple SAR flight profiles are generated in coordination with each other in order to optimize the SAR operations.

15. A system for generating a flight profile for search and rescue (SAR) operations, comprising:
    an in-flight aircraft engaged in SAR operations with an onboard flight management system (FMS) that monitors the flight parameters of the in-flight aircraft;
    a satellite communications (SATCOM) transceiver located on board the in-flight aircraft that transmits the flight parameters to a ground-based FMS;
    a terrain database that provides real-time terrain data to the ground-based FMS;
    a real-time weather database that provides real-time weather data to the ground-based FMS; and
    where the ground-based FMS receives the flight parameters which are transmitted upon command by an aircrew member of the in-flight aircraft in order to request generation of a SAR flight profile for the onboard FMS which lacks a capability to generate a SAR flight profile, generates a SAR flight profile for the in-flight aircraft based on the flight parameters, the terrain data and the real-time weather data and transmits the SAR flight profile to the SATCOM transceiver on board the in-flight aircraft to be loaded FMS into the onboard FMS.

16. The system of claim 15, where the SAR flight profile is loaded into the onboard FMS of the in-flight aircraft.

17. The system of claim 15, where the ground-based FMS generates the SAR flight profile for the in-flight aircraft in coordination with other SAR flight profiles for additional aircraft engaged in SAR operations.

18. The system of claim 17, where the other SAR profiles for additional aircraft are generated by the ground-based FMS in order to optimize SAR operations.

* * * * *